United States Patent [19]

Katz

[11] Patent Number: 5,016,270

[45] Date of Patent: May 14, 1991

[54] EXPANDED TELEPHONE DATA ORGANIZATION SYSTEM

[75] Inventor: Ronald A. Katz, Los Angeles, Calif.

[73] Assignee: First Data Resources Inc., Omaha, Nebr.

[21] Appl. No.: 332,068

[22] Filed: Apr. 3, 1989

[51] Int. Cl.[5] .......................................... H04M 11/00
[52] U.S. Cl. ...................................... 379/92; 379/93; 379/97
[58] Field of Search ...................... 379/91, 92, 67, 96, 379/97; 371/53, 54

[56] References Cited

U.S. PATENT DOCUMENTS

| | | | |
|---|---|---|---|
| 3,675,513 | 7/1972 | Flanagan et al. | 379/97 |
| 4,320,256 | 3/1982 | Freeman | 379/92 |
| 4,532,378 | 7/1985 | Nakayama et al. | 379/96 |
| 4,645,873 | 2/1987 | Chomet | 379/93 |
| 4,658,417 | 4/1987 | Hashimoto et al. | 379/97 |
| 4,797,911 | 1/1989 | Szlam et al. | 379/92 |

Primary Examiner—Jin F. Ng
Assistant Examiner—Stella L. Woo
Attorney, Agent, or Firm—Nilsson, Robbins, Dalgarn, Berliner, Carson & Wurst

[57] ABSTRACT

A considerable memory stores data on individual automobiles, addressed by alphanumeric-code license designations. Access to the memory also is provided from individual telephone terminals through an interface structure with digital and audio capability in association with a code translation unit which enables use of telephone keypad compatible codes to address the memory. The translation involves the addition of a check digit. A caller accessing data on a specific automobile may renew the license and in that regard infractions are policed. Also, billing is performed through a credit system with verification.

9 Claims, 3 Drawing Sheets

FIG. 2

| LICENSE NUMBER | VEHICLE I.D. # | OWNER I.D. (ADDRESS) | NEG. DATA | HISTORY | FEE | PAYMENT AUTH. | CARD NO. | EXP. DATE | ACK. CODE |
|---|---|---|---|---|---|---|---|---|---|
| 2ABC123 | OLD5864 | 733 JOHN J. DOE | P186 | L86 L87 | | | | | |
| 42 | 44 | 46 | 48 | 50 | 52 | 120 | 121 | 122 | 134 |

40, 54, 121, 122

EXPANDED TELEPHONE DATA ORGANIZATION SYSTEM

FIELD OF THE INVENTION

The present invention relates to computerized telephonic communication systems and specifically to such a system for collecting and organizing data provided by callers keying in signals at individual telephone instruments as, for example, to renew an automobile registration.

BACKGROUND AND SUMMARY OF THE INVENTION

In recent years, systems have been developed for use in cooperation with public telephone facilities to receive digital signals from push-button telephones and to utilize such signals in the forms of control and data. Typically, in using a telephone instrument as a digital input device, computer-generated voice messages prompt callers to provide digital signals by actuating the alphanumeric buttons of the telephone keypad. Detailed forms of such systems have been proposed in association with computers to provide various services, and one such system is disclosed in U.S. Pat. No. 4,792,968 issued Dec. 20, 1988, to Ronald A. Katz.

Although prior systems for interfacing an individual person at a telephone instrument with a computer or data processor have been effective, such systems have had certain limitations. In general, the present invention is based on recognizing the significance of numeric codes that are compatible with traditional keypads of telephone instruments. Accordingly, the system of the present invention accommodates data operations as to register, renew or otherwise process data for a multitude of specific individual subjects when the subjects are identified by codes (e.g. alphanumeric) that are incompatible with traditional telephone keypads.

To consider a specific example of the disclosed embodiment, several states issue automobile license plates bearing a designation for each automobile in an alphanumeric code. For example, a license format as "ABC123" expands the aggregate number of designations available in a six-digit system. Typically, information on the vehicle is accessed by the code, e.g. "ABC123". For example, using the assigned code for a vehicle, memory banks are accessible to register and retrieve information, as relating to the theft of an automobile. However, with regard to a traditional telephone instrument keypad, the alphanumeric codes are not capable of uniquely addressing the memory banks because alphabetic characters are ambiguous.

In general, the present invention comprises an interface system for processing data from individual telephone instruments provided in a digital form by a caller actuating the telephone push buttons. The system includes a memory accessible by signals utilizing a code that is compatible with a telephone keypad and an incompatible code as an alphanumeric code. In an exemplary embodiment, the memory is accessible with either code, as for example to enter data relating to a specific automobile. Accordingly, data relating to the theft of a car or its misuse may be accessed using either an alphanumeric terminal or a telephone keypad. Also, unofficial callers may be provided access to the memory by utilizing assigned compatible codes to accomplish an interface as for the annual renewal of automobile registrations with the attendant issuance of tags and collection of fees. Thus, the system of the present invention accommodates expanded use of telephonic communications involving interfaces and the provision of digital data from individual telephone instruments. As disclosed, compatible codes incorporate check digits.

BRIEF DESCRIPTION OF THE DRAWINGS

In the drawings, which constitute a part of this specification, an exemplary embodiment exhibiting various objectives and features hereof is set forth. Specifically:

FIG. 2 is a graphic representation of a memory cell as employed in the system of FIG. 1.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for the purposes of disclosure and to provide a basis for the claims herein which define the scope of the present invention.

Figure 1:
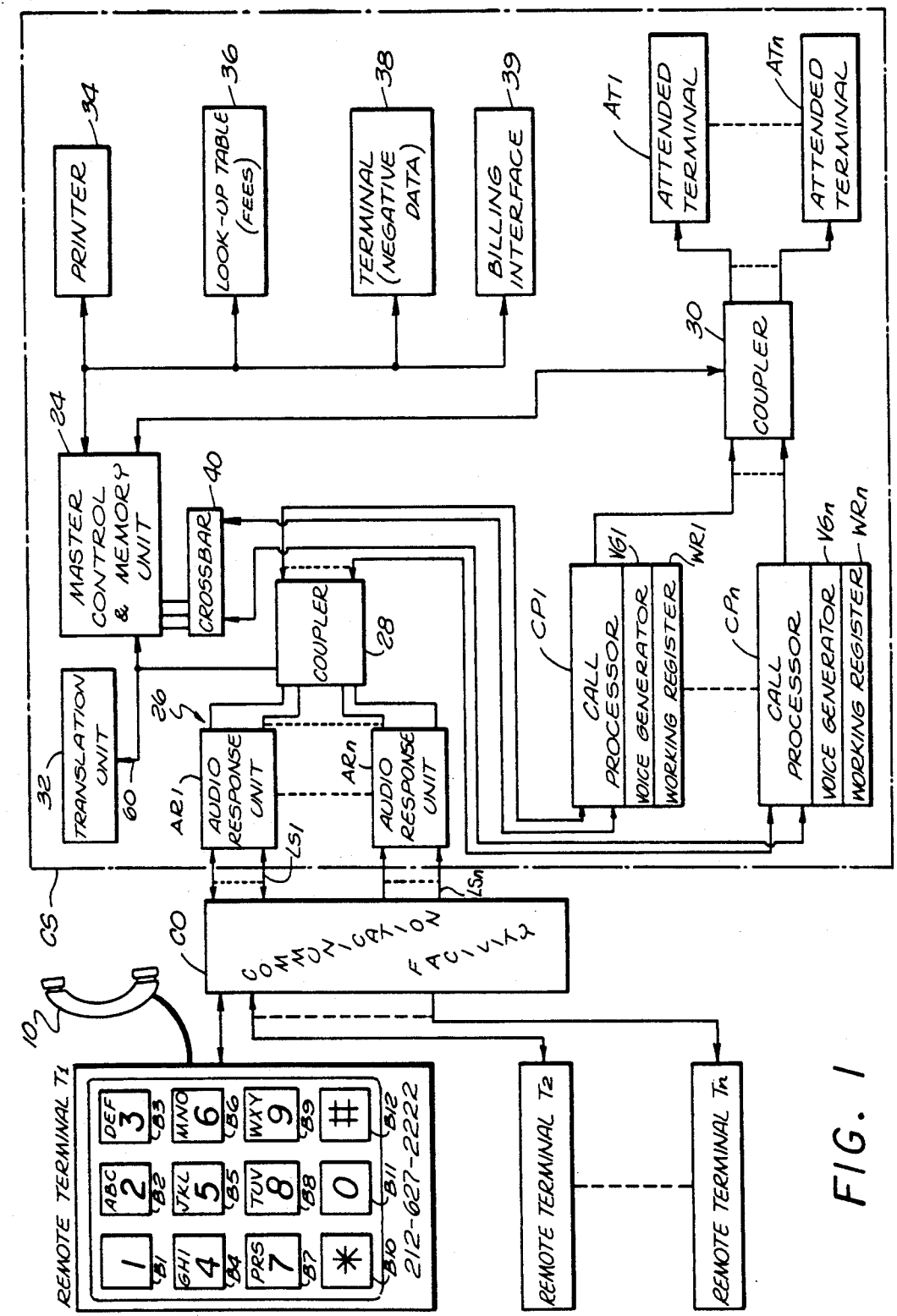
FIG. 1 is a block diagram of a system constructed in accordance with the present invention.

Referring initially to FIG. 1, a series of remote terminals T1–Tn (telephone instruments) are represented (left). The terminals T1–Tn may be similar and, accordingly, only the terminal T1 is shown in any detail. The indicated terminals T1–Tn represent the multitude of telephone terminals existing in association with a communication facility CO which may comprise a comprehensive public telephone network.

The communication facility CO, accommodating the individual terminals T1–Tn, is coupled to a central processing station CS generally indicated by a dashedline block. Within the station CS, processors are provided to interface the terminals T1–Tn so as to accomplish the desired operating format and in accordance with the disclosed embodiment to accommodate registration renewals of automobile licenses.

At any instant of time, the collective interface involving the communication system CO and the processing station CS might involve several thousand calls. Accordingly, the station CS may take the form of a sizable computer or mainframe capable of simultaneously controlling smaller units or directly operating to process many calls simultaneously involving individual interfaces. Although numerous possible configurations are available, for purposes of explanation herein, the central station CS of the disclosed embodiment includes a plurality of audio response units associated with the plurality of individual call processors as discussed in detail below.

At this point, some further detailed description is appropriate with regard to the individual telephone terminals T1–Tn as exemplified by the terminal T1. Each terminal includes a handpiece 10 (microphone and earphone) and a panel or keypad 12 incorporating a rectangular array of twelve individual push buttons B1 through B12. In accordance with convention, the individual buttons B1-B12 are designated in a specific format as illustrated. Specifically, several of the buttons carry alphanumeric designations. The designation relationships are as follows:

| Button | Numeral | Letters |
|--------|---------|---------|
| B1     | 1       | —       |
| B2     | 2       | ABC     |
| B3     | 3       | DEF     |
| B4     | 4       | GHI     |
| B5     | 5       | JKL     |
| B6     | 6       | MNO     |
| B7     | 7       | PRS     |
| B8     | 8       | TUV     |
| B9     | 9       | WXY     |
| B10    | *       | —       |
| B11    | 0       | —       |
| B12    | #       | —       |

Note that the buttons bearing the designations: 1, *, 0, and # are void of any other designation.

In view of the multiple letter designations on several buttons, signals produced by such buttons are ambiguous. For example, depressing the button labeled "2" provides a signal that might be representative of "2", "A", "B" or "C". Thus, substantial ambiguity is involved and as a consequence the keypad 12 is incompatible with respect to alphanumeric codes. In that regard, the system of the present invention accommodates the use of the keypads at the terminals T1-Tn to provide meaningful data and control processes within the central processing station CS. Specifically, for example, the system as illustrated may be employed to renew automobile registrations which are based primarily on alphanumeric license plate designation codes, e.g. "ABC123".

Within the central processing station CS, a substantial computer is represented in the form of a master control and memory unit 24 (FIG. 1, upper center). Substantial memory capacity, as in the form of data banks, is provided by the unit 24 along with a control capability for accessing the memory and coordinating signal movements within the central processing station CS. Basically, the memory within the unit 24 is addressable by alphanumeric codes (license numbers, e.g. "ABC123") which are incompatible with the keypads of the remote terminals T1 through Tn. However, in accordance herewith, callers at the terminals T1-Tn can access the central processing station CS through the communication facility CO to accomplish an interface with specific data cells from the unit 24.

At this stage, some detail of the communication interface arrangement is appropriate for consideration. Essentially, by telephonic dialing (selective depression of the buttons B1-B12) at one of the terminals T1-Tn, the communication facility CO couples a terminal to an audio-response unit AR1-ARn. For example, as a result of dialing a specific telephone number at one of the remote terminals T1-Tn. The communication facility CO couples the actuated terminal through one of several sets of lines LS1-LSn to a select audio response unit AR1-ARn.

From the audio response units AR1-ARn, incoming lines 26 are received by a coupler 28 for communication with individual call processors CP1-CPn (FIG. 1, lower center). Note that the individual call processors CP1-CPn each incorporate an associated voice generator VG1-VGn and a working register WR1-WRn.

While the individual call processors CP1-CPn are illustrated as separate and distinct units, as mentioned above, it is to be recognized that various structural processing combinations based on time sharing, parallel processing, compiler techniques, bus technologies and other well known computer techniques may be employed to accomplish the objective processing as explained in detail below. The structure and functions of the processors CP1-CPn also can be variously incorporated in the AR units AR1-ARn using technology of the art. Of course, specific arrangements and configurations will likely be implemented on the basis of available hardware and software development.

The call processors CP1-CPn are further connected through a coupler 30 to attended terminals AT-ATn. Accordingly, the system incorporates the possibility of terminating a computer interface in favor of a person-to-person communication.

The coupler 30 is connected to the master control and memory unit 24 along with the coupler 28. In that regard, control signals are exchanged to accomplish the operations as described in detail below.

The master control and memory unit 24 is also connected to: a translation unit 32, a printer 34, a look-up table 36, a terminal 38, a billing interface 39, and a crossbar 40 for individual communication with each of the call processors CP1-CPn. Note that both the function and structure of crossbars for selectively interconnecting multiple parallel structures are well known in the computer arts. For a detailed description of crossbars, see the book, "High-Performance Computer Architecture" by Harold S. Stone, published by Addison-Wesley Publishing Company, 1987.

Essentially, the crossbar 40 functions to supply data cells to the individual call processors CP1-CPn which contain information that is supplemented or expanded in accordance with data received at the individual call processors CP1-CPn through the coupler 28 from the remote terminals T1-Tn.

Preliminary to data accumulation, the audio response units AR1-ARn are involved to establish the initial contacts with callers. In that regard, as indicated above, the division of functions between the audio response units AR1-ARn and the processors CP1-CPn may vary considerably depending on available structures and techniques. The disclosed system is merely exemplary in that regard.

The operation of the disclosed embodiment as illustrated in FIG. 1 is described below with respect to a task performed by states of government. Specifically, consider the task of maintaining a database on automobiles and annually licensing the automobiles with the attendant operations of collecting fees and issuing tags. In pursuing the description, some basic data formats and codes will be employed. First, assume automobile license plates are designated with a seven-digit alphanumeric code, e.g. "1AAA111". The first digit is consistently a numeral, the next three digits are consistently alphabetic letters and the final three digits are consistently numerals. Such a system affords a considerable number of individual designations and is generally conceded to be more easily remembered than a purely decimal system.

In the routine operation of the system of FIG. 1, data on individual automobiles is accessed at a terminal 38 using addresses in the form of the alphanumeric identification codes. For example, utilizing the terminal 38, an operator specifies a vehicle license number, e.g. "2ABC123", as an address for the master control and memory unit 24. Accordingly, data cells within the master memory may be fetched to the terminal 38 and supplemented.

Note that certain security provisions should likely be implemented with regard to the extent that data cells on individual automobiles can be modified from any terminal of the system. In any event, using the representative terminal 38 (and similar units), data on an individual automobile might be modified to indicate its theft, its misuse or its total destruction. Thus, an historical record of individual automobiles is maintained in the memory banks of the unit 24 addressable on the basis of alphanumeric license plate codes. Note that although only the single terminal 38 is illustrated with respect to the master control and memory unit 24, it is to be understood that a multitude of terminals (including the terminals T1-Tn and terminals for emergency access as by police units) are contemplated for use with the unit 24.

Assuming the existence of a current, comprehensive file on motor vehicles in the master control and memory unit 24, consider now the annual operation in accordance herewith of license renewal. In that regard, some preliminary operations are to be performed. Preliminarily, the look-up table 36 is programmed with current licensing fee rates. That is, the license fee for each type of vehicle is set into the look-up table 36. Typically, less valuable automobiles would be designated for relatively low fees while more expensive automobiles would designate a relatively high fee.

Next, the master control and memory unit 24 implements a program utilizing the look-up table 36 to actuate the printer 34 to provide renewal notices. Specifically, the master control and memory unit 24 scans through the inventory of every licensed vehicle in a state, vehicles being indexed within the unit 24 on the basis of license numbers, e.g. "2ABC123". An exemplary data cell of the license designation "2ABC123" is illustrated in FIG. 2. Specifically, the memory cell 40 is divided into a number of fields in accordance with an exemplary format. The initial field 42 registers the vehicle license number "2ABC123". The next field 44 registers the vehicle identification, specifically, "Olds864 . . . 733", indicating the vehicle is a 1986 Oldsmobile, designated by further identification numerals 4 . . . 733.

The third field 46 carries the owner's identification, e.g. name, "John J. Doe", address and so on. The fourth field 48 carries negative data with regard to the automobile, e.g. an indication of a parking violation in 1985 is indicated by the designation code "P185".

The registration history of the vehicle is designated in a field 50 by the code representations "L86L87", indicating the vehicle was registered to the current owner in 1986 and 1987 within the licensing state. A field 52 indicates the registration fee, e.g. $54.

Figure 3:
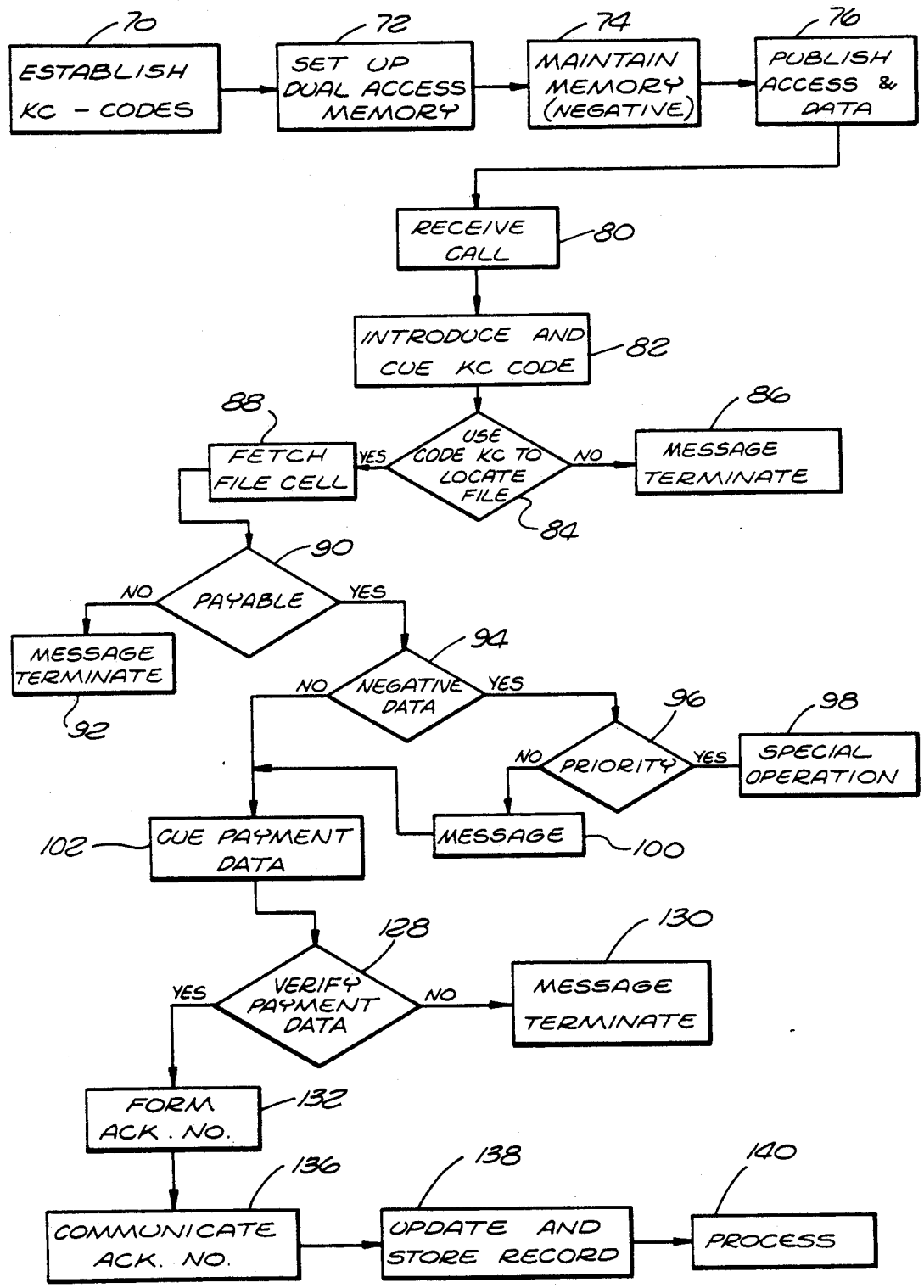
FIG. 3 is a flow diagram illustrating the operating process of the structure represented in FIG. 1.

The remaining fields in the cell 40 as illustrated in FIG. 3 are treated below; however, in the initial process of generating a renewal notice, only the fields treated above are utilized. That is, at the preliminary stage, the pertinent information from the cell 40 is provided from the unit 24 to the printer 34 for the preparation of the desired renewal notice. That is, a notice is printed for each vehicle with the name and address of the owner, the vehicle identification, the license number and so on. For the present, assume that the negative-data field 48 for the exemplary vehicle is not of particular consequence.

In the preparation of the notices, the master control and memory unit 24 (FIG. 1) addresses the look-up table 36 with an indication of the vehicle, e.g. "1986 Oldsmobile". Thus, as indicated above, the appropriate fee for the vehicle is located and provided from the look-up table 36 through the unit 24 to be recorded in the field 52 and also to actuate the printer 34 accordingly. Thus, individual renewal notices are printed, ultimately for transmittal to registered car owners.

At this point, it is important to introduce another element of data for renewal notices. Specifically, a telephone keypad-compatible code for the vehicle designated by the license number "2ABC123" is fetched from the translation unit 32. The compatible codes may be associated with license number codes in a direct numerical relationship. For example, the compatible codes may be derived in accordance with the following chart:

| Alphanumeric Code (Incompatible) | Numeric Code (Compatible) | Check Digit |
|---|---|---|
| 0AAA000 | 000 000 000 | 0 |
| 0AAA001 | 000 000 001 | 1 |
| . | . | . |
| . | . | . |
| . | . | . |
| 0AAA999 | 000 000 999 | 7 |
| 0AAB000 | 000 001 000 | 1 |
| . | . | . |
| . | . | . |
| . | . | . |
| 0AAB999 | 000 001 999 | 8 |
| 0AAC000 | 000 002 000 | 2 |
| . | . | . |
| . | . | . |
| . | . | . |
| 0AAJ999 | 000 009 999 | 6 |
| 0AAK000 | 000 010 000 | 1 |
| . | . | . |
| . | . | . |
| . | . | . |

In accordance with the above format, nine digits are derived directly from the incompatible license numbers. A tenth digit is a check digit. Various techniques are well known for generating check digits. As an example, in the illustrative embodiment, check digits are the least significant digit in the sum of the compatible code digits. Consider an exemplary translation of the license number "2ABC123" to "002 023 1233". The first nine digits "002 023 123" are the direct alphanumeric conversion in accordance with the above table. The sum of these digits is "13", accordingly, the check digit is "3". Thus, the complete compatible number is: "002 023 1233".

Logic and processors capable of accomplishing such translations with signal-represented data and providing check digits are well known. Accordingly, the notice to the registered owner "John J. Doe" of a 1986 Oldsmobile bearing the license number "2ABC123" would carry the code "002 023 1233" in a pronounced location designated as the "telephonic renewal number", the use of which is explained in detail below.

Recapitulating to some extent, the alpha-numeric codes (incompatible) and numeric codes (compatible) have a mathematical relationship of conversion. That is, in accordance herewith, the numeric code (compatible) numerals are convertible to alphanumeric code (incompatible) designations in accordance with a predetermined algorithm. Of course, the algorithm may simply implement the format of the chart set forth above wherein the translation involves a direct numeric relationship. Alternatively, various conversion algorithms may be implemented using known techniques, as for example, an algorithm utilizing a twelve-bit number system with a compatible code including the numerals "0–9", plus the symbols "*" and "#".

The algorithm of conversion is implemented in the translation unit 32 (FIG. 1, upper center). Accordingly, signals representative of keypad-compatible numeric code designations applied at a channel 60 result in return signals in the channel 60 manifesting alphanumeric addresses. The translation unit 32 is also connected to the coupler 28. Accordingly, the master control and memory unit 24 may be addressed from remote terminals T1-Tn through the coupler 28.

To pursue consideration of the exemplary renewal operation, assume that an individual "John J. Doe" receives a renewal notice indicating various information with respect to his vehicle including the amount of a license fee, a telephone number to dial for renewal and a telephone keypad-compatible identification code as described above.

The individual operations to accomplish a renewal will now be pursued with reference to FIGS. 2 and 3. In that regard, note that the block 70 (FIG. 3, upper left) indicates the establishment of the keyboard compatible code KC. The block 72 indicates the establishment and maintenance of a dual access memory as embodied in the combination of the translation unit 32 (FIG. 1) along with the master control and memory unit 24. The memory or file within the unit 24 is deemed to be maintained as indicated by the block 74. As a final preparatory operation, access data and vehicle data are published as illustrated by the block 76, to facilitate telephonic renewal. That is, a renewal notice is sent to John J. Doe. Proceeding from that point, assume that John J. Doe is physically located at the remote terminal T1 and possesses the critical data as provided to him by the notice.

Pursuing the example, at the telephone terminal T1, John J. Doe first actuates the keypad 12 (FIG. 1) in a conventional manner to dial the designated telephone number and establish communication through the facility CO with the central processing station CS. As indicated above, a renewal call is received at the central processing station CS, specifically within one of the audio response units AR1–ARn. The connection operation is represented by the block 80 (FIG. 3).

As well known in the art, audio response units are capable of receiving a multitude of calls and providing audio messages in the form of cues or informative data. In the system of FIG. 1, the specific audio response unit (one of the units AR1–ARn) receiving the exemplary call from John J. Doe provides a confirmatory message to the caller along with a cue. Specifically, the caller might be cued: "Thank you for calling to renew your vehicle license. Your renewal notice has the vehicle telephone code (compatible code KC) printed in the upper, right-hand corner. At this time, please punch in that code." The operation of providing the message and the cue is represented by a block 82 in FIG. 3.

Responsive to the cue, assume the caller actuates the keypad 12 (FIG. 1, upper right) to form digital signals KC representative of the compatible code. The signals KC are provided from the remote telephone terminal T1 through the communication facility CO, one of the audio response units AR1–ARn and the coupler 28 to the translation unit 32 and the master control and memory unit 24. Accordingly, the translation unit 32 converts the numeric code of signals KC into signals AC representing the related incompatible alphanumeric address code as explained above. Accordingly, by indirect use of the compatible code signals KC, the master control and memory unit 24 is addressed with signals AC of the alphanumeric code to fetch the desired data cell. The operation is represented by the block 84 in FIG. 3, a query as to the location of a specified data cell.

To explain the above operation in somewhat greater detail, the caller actuates the keypad 12, punching in the number "002 023 1233" as the compatible code KC to produce the similarly identified representative signals KC. Application of signals KC to the translation unit 32 results in the formulation of digital signals AC representative of the similarly identified code AC, pursuing the example, "2ABC123". In the process, the translation unit 32 tests the check digit to verify the code. If the code is proper, the master control and memory unit 24 is addressed through the translation unit 32 in the conventional manner by the translation to alphanumeric code signals AC, e.g. representing "2ABC123".

Of course, a possibility exists that the check digit is improper or that the file cell cannot be located. Either event is indicated by a negative response from the query block 84 (FIG. 3). For example, the caller may misdial and foul the code or identify a void vehicle number. In such events, a terminate message is provided as indicated by the block 86 (FIG. 3). Specifically, the audio response unit is actuated from the master control unit 24 to provide an oral message: "The telephone renewal number you have punched in is not correct. Please try again or call 674 4343." Of course, various alternatives may be exercised at this junction including the transfer of the caller to an attended terminal for person-to-person communication as discussed in detail below.

Assuming the caller provides a correct code with a valid check digit, translating to "2ABC123", the vehicle file cell is fetched from the master control and memory unit 24 (FIG. 1) and provided through the crossbar 40 to one of the call processors CP1–CPn. The process step is illustrated in FIG. 3 by the block 86. Assume, for example, that the file cell (FIG. 2) is provided to the call processor CP1 for specific processing operations.

Of course, the detailed content of the file cell may vary widely with different applications, policies and objectives. However, pursuing the field format as described above with respect to FIG. 2, data from the master control and memory unit 24 is fetched into the call processor CP1 to load the fields as follows: field 42, license number ("2ABC123"); field 44, vehicle identification ("Olds861-733"); field 46, owner ID ("John J. Doe . . ."); field 48, negative data ("P185 . . ."); field 50, history ("L86L87") and field 52, fee ("$54"). Note that the fee as carried in the field 52 is not a portion of the permanent data stored in the unit 24, rather, the fee is provided from the look-up table 36 through the unit 24 and the crossbar 40 to the call processor CP1. The operations of fetching fields as explained above into the call processor CP1 is represented in FIG. 3 by a block 88.

With the preliminary data stored in the call processor CP1, the system proceeds to verify the identified vehicle and the propriety of the renewal operation. In that regard, the caller is cued and test queries are executed. During these operations, the data cell 40 (FIG. 2) resides in the working register WR1 and the call processor CP1 actuates the voice generator VG1 to cue the caller as the process proceeds.

An initial test operation involves verification that the fee payment is appropriate, e.g. the fee for the current interval has not previously been paid. In that regard, the call processor CP1 simply tests the history field 50 (FIG. 2) to verify that the fee is payable, i.e. has not been paid for the current year, e.g. "1988". The query operation is illustrated by the block 90 in FIG. 3.

Further detailed tests may be performed at this step as, for example, the confirmation of the license vehicle number. Specifically in that regard, the caller might be cued: "The identified vehicle is a 1986 Oldsmobile, license number 2ABC123, registered owner John J. Doe. If that identification is correct, please push '1'. If that information is not correct, please push '2'."

While the determination that the fee is payable by the caller may involve several such tests, the above are exemplary. If any test indicates the fee is not payable, a termination message is given as indicated by the block 92 (FIG. 3). Again, various other alternatives exist as coupling the caller to an attended terminal. In any event, with a positive result from the query block 90, the process proceeds to test the field 48 involving negative data as indicated by the query block 94 in FIG. 3. This step in the process involves several possibilities. For example, various classifications can be established as to the nature of the negative data, e.g. (1) no negative information, (2) negative information not major, or (3) major negative nature. In one format, only callers of the "no negative information" class are permitted to renew by telephone. Others are required to personally appear at an office for renewals.

Another aspect involves vehicles with recorded major negative information, as use in a crime. For such cases, it may be desirable to transfer the caller to a trained interrogator.

In the disclosed format, renewals are permitted for vehicles with minor negative data. Cases involving more serious negative data are given special treatment as indicated by the block 98. Such special treatment may involve transferring the call to one of the attended terminals AT1–ATn, or simply informing the caller that renewal must be performed in person.

In the example, assume the cell (field 48) on the subject vehicle does not indicate any negative data of major significance, e.g. a single parking violation in 1986. Recapitulating to some extent, the call processor CP1 performs two tests. Specifically, a test for the presence of negative data as indicated by the block 94 and a test regarding the significance or priority of negative data as indicated by the block 96. In the assumed example, negative data is present; however, it is not priority data.

In a situation involving priority negative data, the special operation is implemented as indicated by the block 98. In such instances, the call processor transfers the call through the coupler 30 (FIG. 1) to one of the attended terminals AT1–ATn for special treatment.

In the assumed case, the call processor CP1 next provides a message as indicated by the block 100. As a specific example, the call processor CP1 might actuate the voice generator VG1 to provide a message as: "Your vehicle is charged with a 1986 parking violation and $25 is due to cover that violation. Please confirm that the amount is to be added to your renewal fee by punching '1', otherwise punch '2' and renew in person at a vehicle office." Of course, any of a variety of formats might be employed regarding negative data during renewal as to collect fines. In any event, the process proceeds to block 102 (FIG. 3) which represents the next step in the process when no negative data exists. Block 102 illustrates the process of cueing payment data.

With substantial data contained in the working register WR1 (FIG. 2, loaded fields 42, 44, 46, 48, 50 and 52) and preliminary matters resolved, the system proceeds to complete the contents of the working register. Generally, the payment authority and the charging account are determined and recorded. In that regard, the voice generator VG1 (FIG. 1) is actuated by the call processor CP1 to provide signals through the coupler 28, the audio response unit AR1 and the communication system CO to deliver an audio cue. For example, the next cue may take the form: "Your renewal fee may be charged either to a 'VISA' card or 'Mastercharge' card. Please press '1' if you wish to use your 'Mastercharge' card and press '2' if you wish use your 'VISA' card."

In response to the cue, the caller designates a payment authority by either a "1" or a "2" digital signal which is received by the call processor CP1 to load a field 120 accordingly (FIG. 2) in the working register WR1 (FIG. 1).

In a similar manner, cues are given and fields 121 and 122 are loaded with the caller's credit card number and the card expiration date. Specifically in that regard, the call processor CP1 (FIG. 2) actuates the voice generator VG1 to cue the caller for the card number and expiration date. Such information is punched into the keypad 12 at the terminal T1 to provide digital signals manifesting the data that is ultimately registered in the fields 121 and 122. The system next proceeds to confirm the data, check the account and issue an acknowledgement.

The next cue might confirm the received data as: "The 'VISA' credit card number '37 . . . 401' with an expiration date of July 1988 has been recorded to pay a fee of $54 on the vehicle identified by license number 2ABC123. If that information is correct, please depress the '1' button. Otherwise, press the '0' button."

This step is part of the verification test as illustrated in FIG. 3 by the block 128. Specifically, the registered charge data is confirmed, then tested on-line for authorization. In that regard the charge data (account number and date of card expiration) is communicated from the working register WR1 (FIG. 1) through the crossbar 40 and the unit 24 to the billing interface 39. A direct line from the interface 39 to a credit authorization facility (not shown) carries signals representative of the charge data. If the charge is accepted, an authorization number is communicated to the call processor CP1. Specifically, signals representative of the authorization number pass from the billing interface 39, through the unit 24 and the crossbar 40 to the call processor CP1. Of course, an alternative possibility is refusal to authorize. If there is no verification or authorization, the process proceeds with an appropriate message of termination as illustrated by the block 130 (FIG. 3).

With a verification and authorization (indicated by the block 128) the call processor CP1 generates an acknowledgement code CK as indicated by the block 132. The signal-represented acknowledgement code may be variously developed from the authorization code and factual data, e.g. the time of the call, the call processor involved, and so on. In any event, an acknowledgement code CK is formulated, stored in a field 134 (FIG. 2) of the working register WR1 (FIG. 1) and communicated to the caller as indicated by the block 136.

In the course of communicating the acknowledgement code to the caller, a termination message is provided cueing the caller to "hang up" thereby breaking the connection. Accordingly, the record is complete for the collection of fees and the issuance of a tag indicating renewal of the automobile license.

After the caller interface is concluded, the contents of the working register WR1 (FIG. 1) is returned through the crossbar 40 to the master control and memory unit 24 as illustrated by the block 138 in FIG. 2. The individual renewal record as manifest by the data cell 40 (FIG. 2) is then processed as a credit transaction. The processing may involve various bulk operations as well known in the prior art and is illustrated by the block 140 (FIG. 3).

In view of the above description, it may be seen that effective registration and data maintenance is provided by the system of the present invention. The multitude of persons who are compelled to engage in renewal or registration activities are afforded considerable convenience. Furthermore, the agency of renewal or registration is afforded a database with minimal human interface. In addition to these considerations, it is to be noted that systems of the present invention afford an effective means for controlling and regulating objects as in the case of misused motor vehicles.

In the above detailed description, it was assumed that the exemplary license being renewed did not identify a seriously misused vehicle. However, consider the possibility that the vehicle is stolen, used in the commission of a felony or otherwise misused in a seriously significant manner. Typically, meaningful information regarding the vehicle includes the license number and some basic identification data. Using the system of the disclosed embodiment with such data, the terminal 38 (FIG. 1, right central) is actuated to address the master control memory unit 24 with the alphanumeric license number. With confirmation, a code is registered in the negative data field 48 to indicate the misuse as negative data and the cell is returned to storage. Thus, the data is readily accessible if a person attempts to renew the license of the vehicle. In that event, as explained above, the negative data is detected and determined to be of a priority which actuates an interface between the caller and a person at one of the attended terminals AT1-ATn (FIG. 1, lower right). It is anticipated that the terminals AT1-ATn will normally be manned by trained personnel so as to pursue the possibility of extracting further information with regard to the caller or the vehicle in question.

In view of the description, it will be apparent that the system of the present invention may be effectively used in telephonic interfaces to accommodate considerable convenience as in renewal operations and furthermore that the system provides an effective database for regulation and control. Although the disclosed embodiment is directed to a vehicle renewal operation, it will be apparent that the system may be variously embodied to accommodate any of a variety of telephonic interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A data system, as for use by callers, as to register and supply data regarding specific subjects through telephonic facilities from telephone instruments including digital input means for providing digital response signals, said data system comprising:

control and memory means for storing data related to said specific subjects as for registration and including addressing means for alternatively addressing said memory means with signals representing telephone keypad compatible designation codes and telephone keypad incompatible designation codes to access said data related to said specific subjects;

attended terminal means coupled to said control and memory means as to receive data related to said specific subjects and further to provide telephone keypad incompatible designation codes to said addressing means to address said control and memory means for access;

cue means for cueing select connected ones of said telephone instruments to prompt actuation of said telephone instrument digital input means to provide responsive telephone keypad compatible designation code signals;

means for applying said responsive telephone keypad compatible designation code signals to said addressing means in a form to access data related to an identified subject; and processor means including working register means to store data from a caller at a telephone instrument, said data being pertinent to said identified subject in said control and memory means.

2. A system according to claim 1 wherein said incompatible designation code is an alphanumeric code.

3. A system according to claim 1 wherein said compatible designation code is a numeric code.

4. A system according to claim 1 wherein said incompatible code and said compatible code are numerically related.

5. A system according to claim 1 wherein said control and memory means to store data related to said specific subjects comprises a data cell and wherein said data cell is addressed by said addressing means to receive data from said working register means.

6. A system according to claim 5 further including means for generating acknowledgement representations to be stored in said data cell.

7. A system according to claim 5 further including means for storing negative data in said data cell.

8. A system according to claim 1 wherein said compatible code includes a check digit.

9. A system according to claim 1 further including a credit authorization link for registering authorization data in said means to store data.

* * * * *